Oct. 27, 1970 H. SCHLUTER 3,536,845
PATH SWITCH OVER SYSTEM GUIDE WIRE CONTROLLED MULTISTAGE CROSSPOINT NETWORK
Filed May 15, 1967
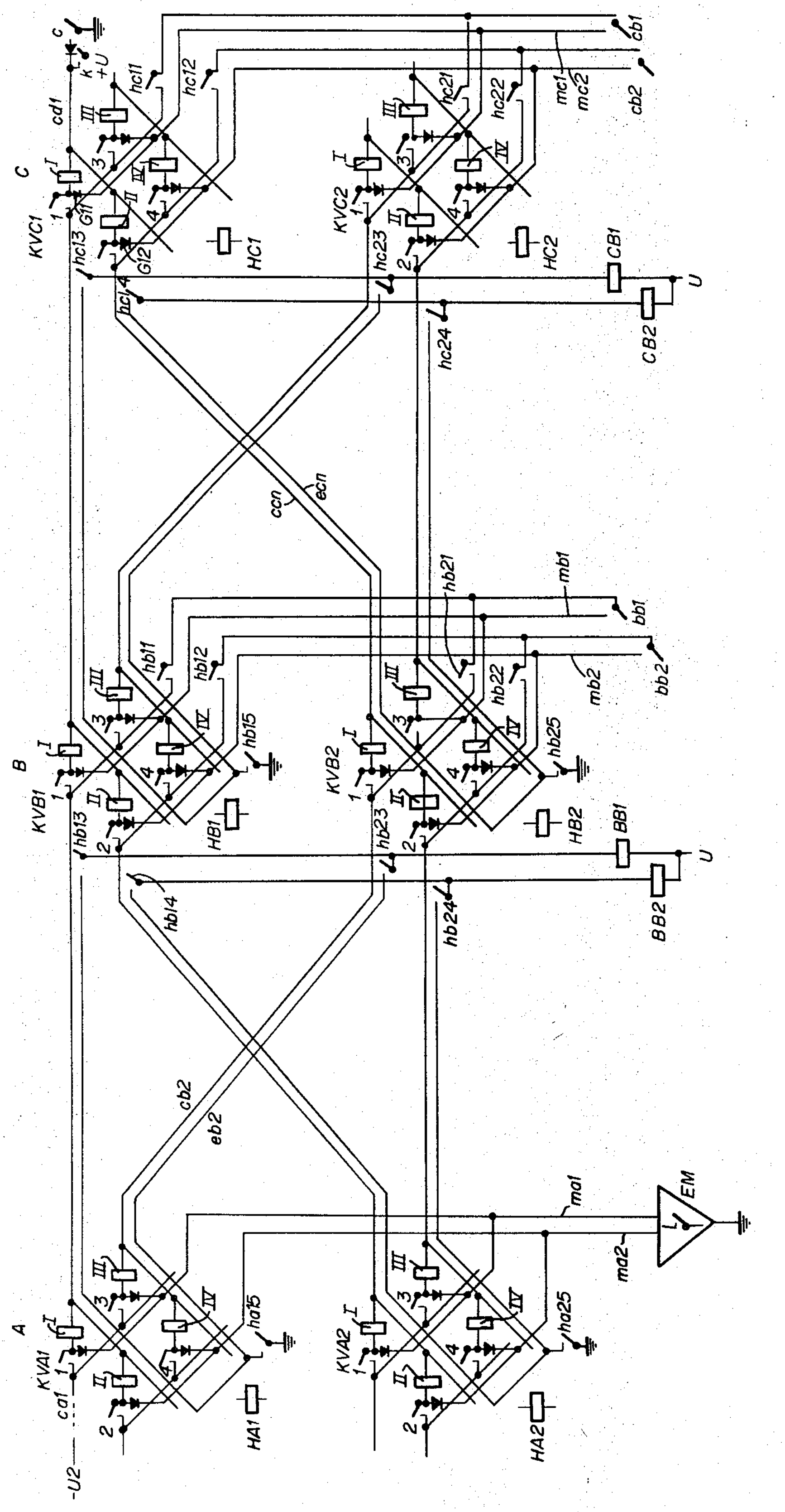

3,536,845

PATH SWITCH OVER SYSTEM GUIDE WIRE CONTROLLED MULTISTAGE CROSSPOINT NETWORK

Heinz Schluter, Kornwestheim, Germany, assignor to International Standard Electric Corporation, New York, N.Y., a corporation of Delaware Filed May 15, 1967, Ser. No. 638,374
Claims priority, application Germany, May 20, 1966, St 25,429
Int. Cl. H04q 3/42
U.S. Cl. 179—18 4 Claims

ABSTRACT OF THE DISCLOSURE

Circuit arrangement for multistage crosspoint network permits a simultaneous through-connection in all switching stages. All crosspoint relays which are to be excited are series-connected through the seizing wires. No link relay is required.

The invention relates to a guide wire circuit path selection arrangement for a multistage crosspoint network—and more particularly to one in which a guide wire route searching facility selects a switching multiple in each switching stage and then operates a switching multiple marking relay associated with the selected multiples.

In a regular crosspoint network, such as that disclosed in U.S. Pat. No. 3,310,633 which issued on Mar. 21, 1967 and which is assigned to the assignee of this invention, a connecting path is defined by a selection of the switching multiples to be included in the path. Since only one link leads from each of the selected switching multiples to a switching multiple in the adjacent switching stage, there is no problem of selecting one from two or more branching paths. However, in the system having a plurality of links between multiples of different stages the corresponding link must be selected.

The crosspoint relays must then be actuated in order to through-connect the selected connecting path. Known art provides a coordinate-like arrangement for the actuation of the crosspoint relay. For this, the relay is connected with marking wires which are individual to the columns and rows, respectively, and common to all switching multiples of an entire stage. The marking wires are selectively energized by the marker. However, this method requires a relatively high expenditure in marking equipment.

To reduce the cost of the described system, it is commonplace to mark the crosspoint relays via a seizing wire associated with a link arriving from the adjacent switching stage. If a column of a switching multiple is marked in this way, it is only necessary to mark the wires in the rows in order to selectively operate a cross-point relay. In these arrangements, the seizing wire is marked through a make-contact of a crosspoint relay which is already operated. The disadvantage of these known arrangements is that the through-connection can be carried out only on a stage-by-stage basis. Hence, the system is inherently slow.

In order to enable a simultaneous through-connection of all switching stages, a recently developed system serially connects all crosspoint relays which are to be excited. This system is disclosed in the pending patent application Ser. No. 591,188 filed on Nov. 1, 1969 on an invention of Heinz Schluter and assigned to the assignee of the invention. This series circuit is completed through contacts of the actuated switching multiple marking relays and the seizing wires of the selected connecting path. If corresponding potentials are applied to the input and output end of the seizing wires, all crosspoint relays are energized in series via the selected crosspoint relays. For this arrangement, however, a relay is required for each link, and the relay is excited after the through-connection of the path. A break-contact of each of these relays is arranged in series with the contact of the switching multiple marking relays in order to provide the series-connection of the crosspoint relays. This break contact avoids any influence upon the through-connected paths if a marking process is carried out later. The expenditure for this break contact is acceptable if the relay is already required, as to busy mark the guide wire network, for example. However, if such a busy marking is not already required, the use of a relay for each link means a considerable expenditure.

The object of the invention is to avoid this expense disadvantage.

According to the invention, the problem is solved by connecting the winding of a crosspoint relay to the input rows of the switching stage through the seizing wire of the link, the switching multiple of an output column, and through a marking wire associated, in common, via an individual rectifier for each crosspoint. A marking relay is associated with each marking wire. After the excitation of the associated marking relay and of a switching multiple marking relay, a marking wire can be connected to the seizing wire of the link which connected to the corresponding input row of the selected switching multiple. The cost is substantially reduced, as compared with the cost of a relay each per link, because the only additional relays are one per inputs for a switching multiple.

A further embodiment of the invention provides that, an operated switching multiple marking relay applies a potential to one setting wire of the links which is connected to the output columns of the associated switching multiple. This same relay connects the setting wires of the links at the input rows of the associated switching multiple, to the marking relay associated with the corresponding input rows. Thus, the cost of the marker can be reduced because the items of marking information are automatically obtained from the adjacent switching stages. Thus, any transmission or transfer of information in the control circuits is superfluous.

However, if provisions already exist for the transmission of such information through the system, the marking relays can be actuated by the marker.

A further embodiment of the invention provides that the marking relays of a stage are arranged in a blocking chain, that is an arrangement whereby only one of these marking relays can operate at any given time. Therefore, the invention can also be applied to non-regular crosspoint arrangements without an extensive additional expenditure.

According to a further embodiment of the invention, if a switching multiple of a stage is connected through links to mutually equal-ranking input rows of the switching multiples of the succeeding switching stage, the setting wires of the links carry potential through a contact of one of the excited switching multiple marking relays. The wire can be led through decoupling rectifiers to the marking relays of the succeeding switching stage.

The above mentioned and other features of this invention and the manner of obtaining them will become more apparent, and the invention itself will be best understood by reference to the following description of an embodiment of the invention taken in conjunction with the accompanying drawing, in which the single sheet of drawing shows two horizontals of three cascaded stages in a switching network.

The drawing represents a part of a crosspoint network including two horizontal switching multiples of three cascaded switching stages. The horizontal switching multiples are labeled KV . . . 1 and KV . . . 2 and three stages are marked A, B, and C. The crosspoint multiples are, therefore, marked KVA1, KVA2 in stage A, KVB1, KVB2 in stage B, and KVC1 and KVC2 in stage C.

Switching multiple marking relays HA1 to HC2 are associated with each switching multiple. The relay is actuated when the associated switching multiple is selected during the route search in the guide wire system. Assume that the selected switching multiples are KVC1, KVB2 and KVA1. The relays HC1, HB2, and HA1 are excited. Through contacts such as contacts *ha*15, ground is applied to the setting wires (only one is marked with *eb*2) of all links. The ground connection starts from the switching stage A, in this example multiple KVA1 and propagates itself in the direction towards the switching stage B.

In stage B, the contacts *hb*23 and *hb*24 of relay HB2 connect the setting wires of all links from stage A through a portion of the selected switching multiple KVB2 to the marking relays BB1, BB2 of stage B. Relay BB1 is associated with all first input rows of the switching multiples of stage B, relay BB2 is associated with all second input rows of the switching multiples of stage B. Of course a switching multiple may have more than two inputs and, consequently, more marking relays must then be provided.

The link including the setting wire *eb*2 is connected to the first input row of the switching multiple KVB2. Thus, the wire *eb*2 is connected to the marking relay BB1 via contact *hb*23. The relay BB1 operates over a circuit traced from the potential U, through relay BB1, contact *hb*23, setting wire *eb*2, and contact *ha*15 to the marking ground-potential.

Relay CB2 responds in similar manner through the setting wire *ecn*, which is marked by the ground potential applied through contact *hb*25, and contact *hc*14. The contacts *cb*2 and *bb*1 close and establish the following circuit for operating relay II in the switching multiple KVC1, relay I in the switching multiple KVB2, and relay III in the switching multiple KVA1, provided that the potential +U is applied to the seizing wire *cd*1 through a contact *k* and ground potential is applied via contact 1 to the final marker EM. The circuit may be traced from potential +U through contact *k*, seizing wire *cd*1, the winding of relay II in KVC1, rectifier G12, marking wire *mc*2, contact *cb*2 of relay CB2, contact *hc*12 of relay HC1, seizing wire *ccn*, the winding and rectifier of relay I in KVB2, marking wire *mb*1, contact *bb*1 of relay BB1, contact *hb*21 of relay HB2, seizing wire *cb*2, the winding and rectifier of relay III in KVA1, the marking wire *ma*1, and contact 1 in the final marker EM to ground potential.

That means that a series-connection exists through all crosspoint relays which are selected to be excited. Thus they respond simultaneously, and the connecting path is through-connected with an optimum speed.

In the crosspoint arrangement shown in the drawing, the marking is applied through a final marker EM. Instead of this marking, an arrangement can be used with marking relays connected as shown in the stages B and C. Moreover, the links are shown as arranged in a way such that a regular crosspoint arrangement is obtained (i.e. one wire for each interstage path). If, for example, several links should extend between the switching multiples KVB2 and KVC1, the marking relays CB should be operated in a blocking chain. This chain circuit would prevent more than one of the marking relays of stage C from operating at any given time. Thus, the blocking chain would select a unique intermediate link extending between the selected multiples.

The crosspoint arrangement may also comprise more than the three stages shown.

When the through-connection is completed, the marking potential is switched off. The connecting path is thereafter held in the following circuit: ground potential, contact *c*, an unnumbered diode wire, *cd*1, the winding and make-contact 2 of relay II in KVC1, wire *ccn*, the winding and contact 1 of relay I in KVB2, wire *cb*2, the winding and contact 3 of relay III in KVA1, and the wire *ca*1 . . . to the −U2 potential.

Diodes may be used instead of the contacts of the switching multiple marking relays if there is a condition such that a switching multiple in the succeeding stage can reach only the equal-ranking input rows of the individual switching multiples. These diodes connect the setting wires with the marking relays.

One may omit the setting wires, if an information concerning the switching multiple, selected in the preceding stage, reaches the following switching stage in another manner. For example, the marking relay which is to be actuated (e.g. BB1) can be actuated selectively by the marker if information corresponding to the link marking transmission is provided in the control (marker). This could be of advantage, for example, when using a highly centralized control.

While the principles of the invention have been described above in connection with specific apparatus and applications, it is to be understood that this description is made only by way of example and not as a limitation on the scope of the invention.

I claim:

1. A circuit arrangement for switching through a selected path in a crosspoint network,
said network comprising a plurality of stages,
each of said stages comprising a plurality of switching multiples,
said multiples being equipped with crosspoint relays for selectively switching through said multiples,
said multiples being interconnected with interstage multiwire links,
said links comprising setting wire means for use in preparing the crosspoint relays for operation and a seizing wire for use in operating the prepared crosspoint relays,
a switching multiple relay associated with each of said multiples,
said switching multiple relays being operated when the selected path is switched through the associated multiples,
first contact means on each of said switch multiple relays operated responsive to the operation of said switching multiple relays for applying a first potential on the setting wire means of the multiwire links extending from said associated multiple,
marking means at each of said stages common to the multiples of each of said stages,
means responsive to the operation of the marking means at a first of said plurality of stages for applying the first potential to one side of a selected crosspoint relay in one of the multiples in said first stage,
means responsive to the operation of the marking means in the other of said plurality of stages for connecting a selected crosspoint relay in each of the said other of said plurality of stages in series with the selected relay in said first of said plurality of stages,
said series connection of crosspoint relays including the seizing wire means of said multiwire link means,
operating means included in said marking means in the other of said plurality of stages for operating said marking means responsive to the operation of one of the switching multiple relays in said stages and the first potential being present on the setting wire extending to the multiple associated with the operated switching multiple relay,
means for applying a second potential to the selected crosspoint relay of the last stage of said plurality of stages to provide an operating potential across said serially connected relays, and
means responsive to the operation of said serially connected relays to disconnect the marking means and to hold the crosspoint relays operated over a circuit including hold contacts on said operated crosspoint relays.

2. The circuit arrangement according to claim 1 wherein said marking means in the other of said plurality of stages comprise, common marking wires, connecting means for selectively connecting said common marking wire to the seize wire means of said multiwire link, said operating means comprising marking relay means operated responsive to said first potential being applied from said setting wire means through second contact on said switching multiple relays, and said connecting means comprising contacts on said marking relays.

3. The circuit arrangement according to claim 2 wherein said common marking wires are coupled to said crosspoint relays through decoupling rectifier means.

4. The circuit arrangement according to claim 1 wherein said network comprises primary, secondary and tertiary stages, and wherein said marking means of said secondary and tertiary stages comprises common marking relays.

References Cited

UNITED STATES PATENTS

| | | |
|---|---|---|
| 3,309,466 | 3/1967 | Fambach et al. |
| 3,347,994 | 10/1967 | Schluter. |
| 3,347,995 | 10/1967 | Schluter et al. |

KATHLEEN CLAFFY, Primary Examiner

W. A. HELVESTINE, Assistant Examiner